Aug. 9, 1938.     F. L. MAIN     2,126,485
BRAKE MECHANISM
Filed April 6, 1936     4 Sheets-Sheet 1

INVENTOR
FRANK L. MAIN
BY
ATTORNEYS

Aug. 9, 1938.   F. L. MAIN   2,126,485
BRAKE MECHANISM
Filed April 6, 1936   4 Sheets-Sheet 2

INVENTOR
FRANK L. MAIN
BY
ATTORNEYS

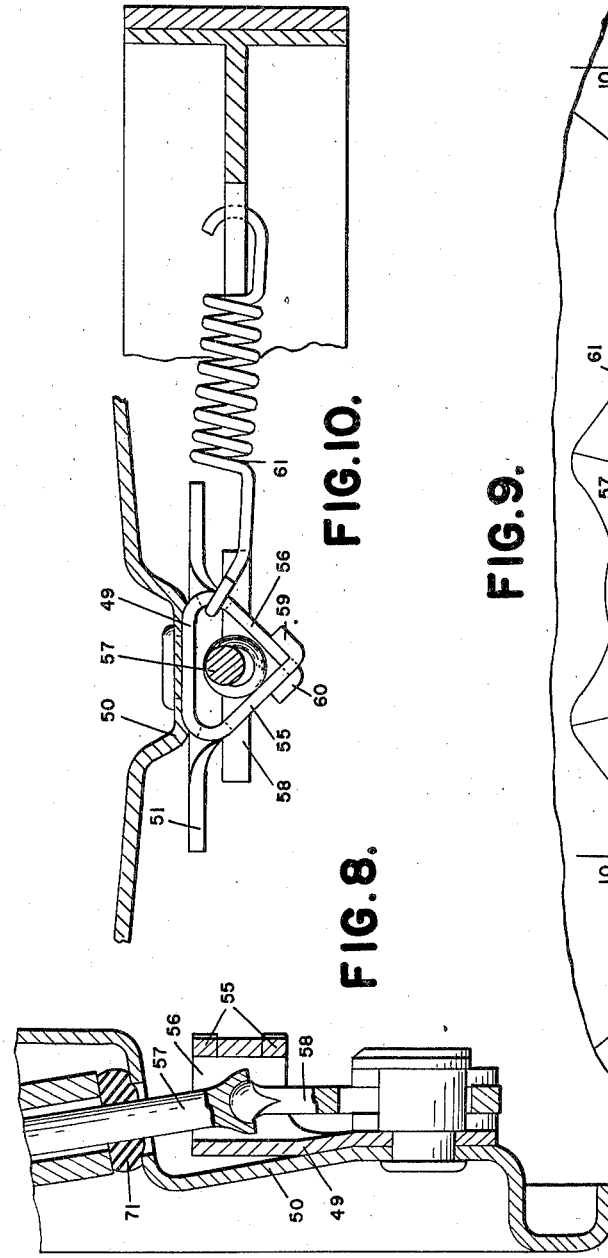

Aug. 9, 1938.  F. L. MAIN  2,126,485
BRAKE MECHANISM
Filed April 6, 1936  4 Sheets-Sheet 4
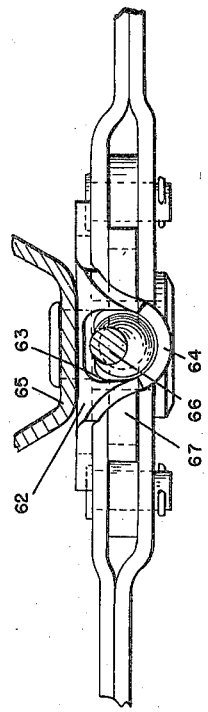
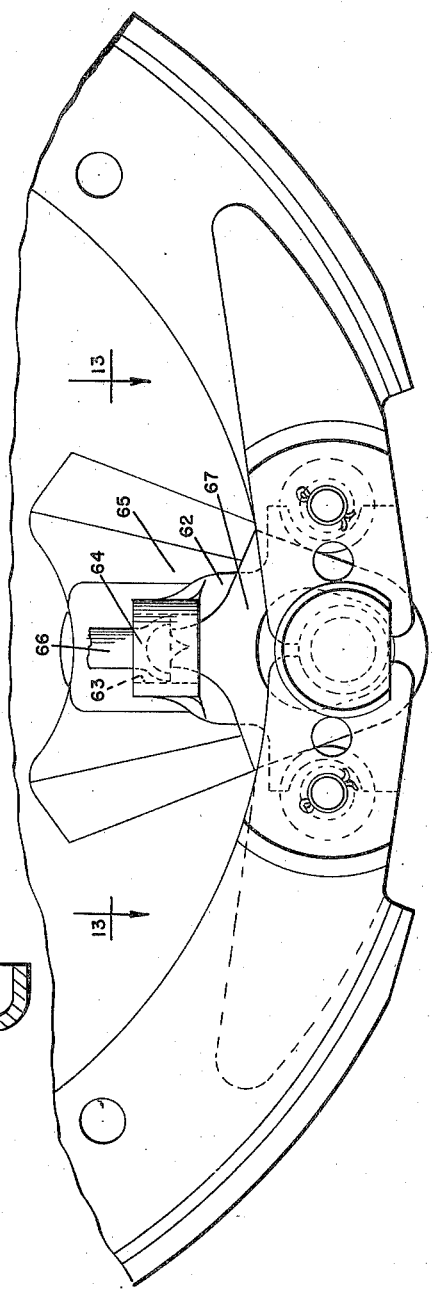
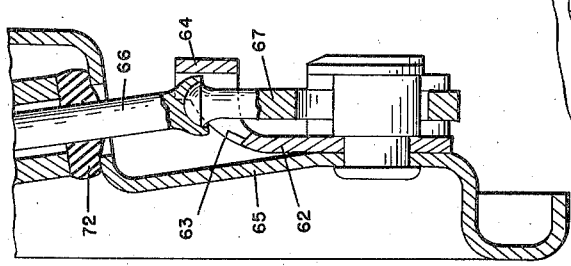
INVENTOR
FRANK L. MAIN
BY
ATTORNEYS Patented Aug. 9, 1938

2,126,485

UNITED STATES PATENT OFFICE 2,126,485

BRAKE MECHANISM

Frank L. Main, Birmingham, Mich., assignor to Kelsey-Hayes Wheel Company, Detroit, Mich., a corporation of Delaware Application April 6, 1936, Serial No. 72,997

17 Claims. (Cl. 188—194)

The invention relates to brake mechanisms and refers more particularly to brake mechanisms for use with the steering wheels of motor vehicles and of that type comprising a wedge engageable with the adjacent ends of brake friction means to actuate the same and a push rod engageable with the wedge to actuate the wedge.

The invention has for one of its objects to provide an improved device for actuating the brake friction means, the device being so constructed that it will operate efficiently and that it may be economically manufactured. The invention has for other objects to simplify the construction of the wedge and the cooperating parts of the brake friction means; to mount the wedge so that it may adjust itself readily to the brake friction means; and to guide the wedge so that it and the associated parts cannot bind. The invention has for a further object to provide a guide for the wedge so constructed that it may also guide the push rod and the brake friction means.

These and other objects of the invention will become apparent from the following description, taken in connection with the accompanying drawings, in which Figure 1 is a sectional elevation of an axle and steering wheel mounting equipped with a brake mechanism embodying my invention;

Figure 8 is a view similar to Figure 4 showing another embodiment of my invention;

Figure 9 is a side elevation thereof;

Figure 10 is a cross section on the line 10—10 of Figure 9;

Figure 11 is a view similar to Figure 4 showing another embodiment of my invention;

Figure 12 is a side elevation thereof;

Figure 13 is a cross section on the line 13—13 of Figure 12.

Figure 2:
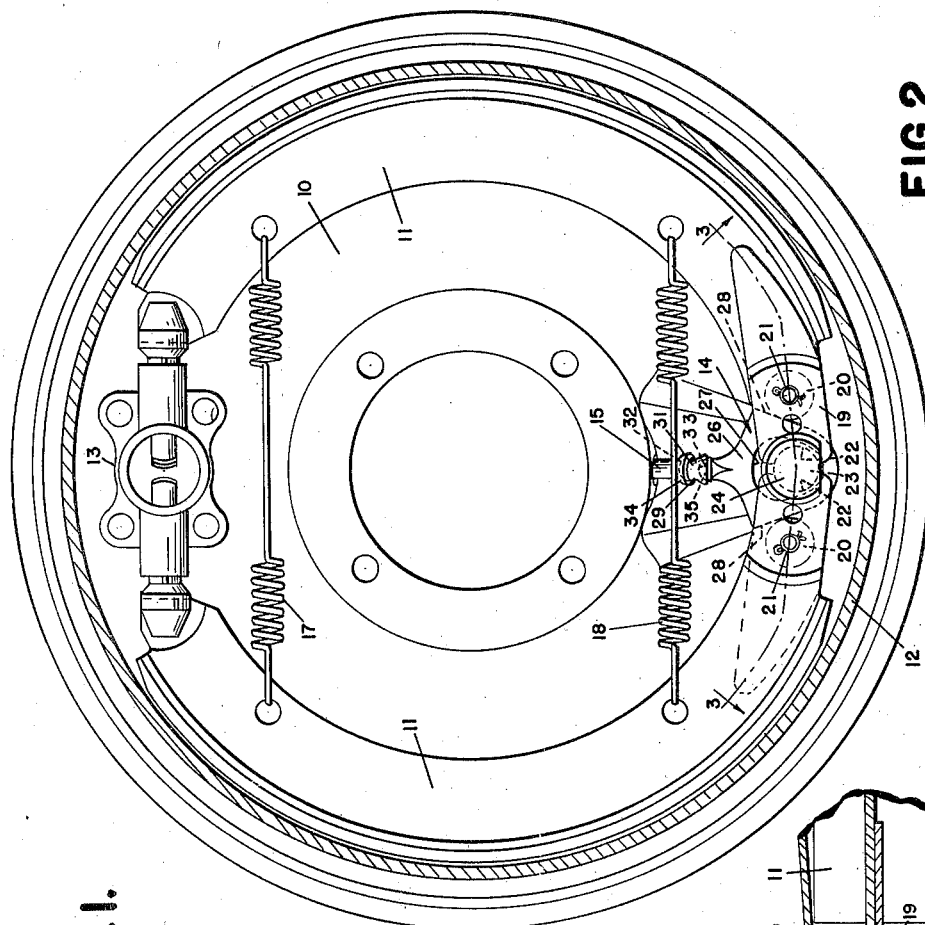
Figure 2 is a side elevation, partly in section, illustrating the brake mechanism of Figure 1.
Figure 1:
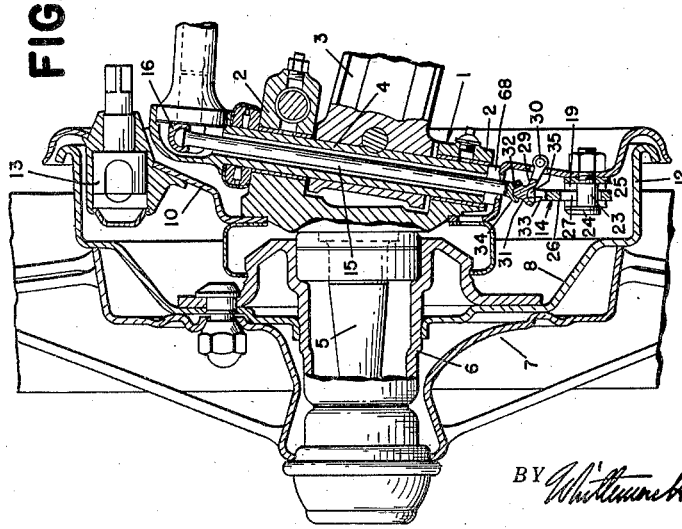
Figure 3:
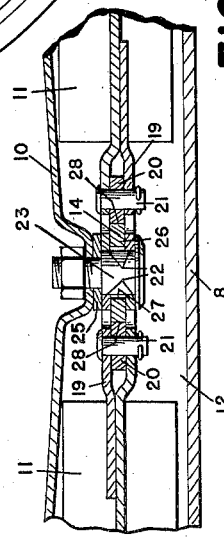
Figure 3 is a cross section on the line 3—3 of Figure 2.

As illustrated in Figures 1, 2 and 3, 1 is a steering knuckle having the furcations 2 respectively above and below the axle 3, which in the present instance is the front axle of the motor vehicle. This steering knuckle is swiveled to the axle by the hollow pin or sleeve 4 and has the spindle 5 upon which is journaled the hub 6. 7 is a steering wheel and 8 is a brake drum mounted upon the hub and fixedly secured to its fixed flange. 10 is a backing plate for the brake drum mounted upon and fixedly secured to the steering knuckle and 11 is the brake friction means in the nature of brake shoes within the brake drum and frictionally engageable with the annular brake flange 12. The upper ends of the brake shoes are adapted to be suitably adjustably mounted upon the backing plate by means of the adjustment anchor device 13, which forms the subject matter of my copending application Serial No. 70,431, filed March 23, 1936. The brake shoes are adapted to be forced into frictional contact with the brake flange by the wedge 14 engageable with the lower ends of the shoes and this wedge is adapted to be longitudinally moved in a radially outward direction by means of the longitudinally movable push rod 15 which extends freely through the hollow pin or sleeve 4 and is adapted to be actuated by suitable means, such as the lever 16 at its upper end. The brake shoes are adapted to be retracted from frictional engagement with the brake flange by means of the coil springs 17 and 18, which are respectively connected to the upper and lower ends of the brake shoes.

Each of the brake shoes is preferably of T cross section and has at its lower end the pair of laterally spaced extensions or extension plates 19. As shown, one is formed by laterally offsetting the lower end of the web or stem and the other is a plate fixedly secured as by welding to the web or stem. Located between these extensions is the roller 20 which is also located beyond the end of the web or stem and which is journaled upon the pin 21 extending through the extensions. The free ends of the extensions are formed with the concave seats 22 for engaging the shouldered pin 23 which is fixedly secured to the backing plate 10. This shouldered pin forms an abutment for the lower ends of the brake shoes and predetermines their normal or inoperative positions. Furthermore, the head 24 of this shouldered pin and the washer 25 serve to guide the lower ends in their movements toward and away from the brake flange. The wedge 14 has the flat sheet metal body 26 which has the central opening 27 through which the shouldered pin 23 extends. This flat body is adapted to extend between the pairs of extension plates of the shoes and it is provided with the upwardly diverging edges 28 which are engageable with the rollers 20. The central opening 27 has a peripheral dimension greater than the diameter of the portion of the shouldered pin 23 extending through the opening to provide clearance to enable the wedge to adjust itself to the shoes in the event that they move unequal extents when being forced into frictional engagement with the brake flange. Furthermore, the peripheral extent of this opening preferably increases in the radially inward direction relative to the brake mechanism.

The push rod 15 extends at an angle to the wedge 14 so that upon actuation of the push rod to actuate the wedge there is a lateral force component tending to move the upper end of the wedge laterally or axially away from the backing plate. To guide the upper end of the wedge and prevent any objectionable binding of the wedge upon the brake shoes or of the brake shoes upon the shouldered abutment pin, I have provided the lever 29 which extends through the backing plate and is pivotally mounted thereon at 30. The free end of this lever is formed with the head 31 having the convex hemi-spherical or rounded bearing surface 32 at its upper end and the concave hemispherical or rounded bearing surface 33 at its lower end. The convex bearing surface fits in a concave hemi-spherical or rounded bearing surface formed in the head 34 at the lower end of the push rod 15 and the concave bearing surface receives the head 35 at the upper end of the wedge and fits the convex hemispherical or rounded bearing surface of this head.

Figures 4, 5:
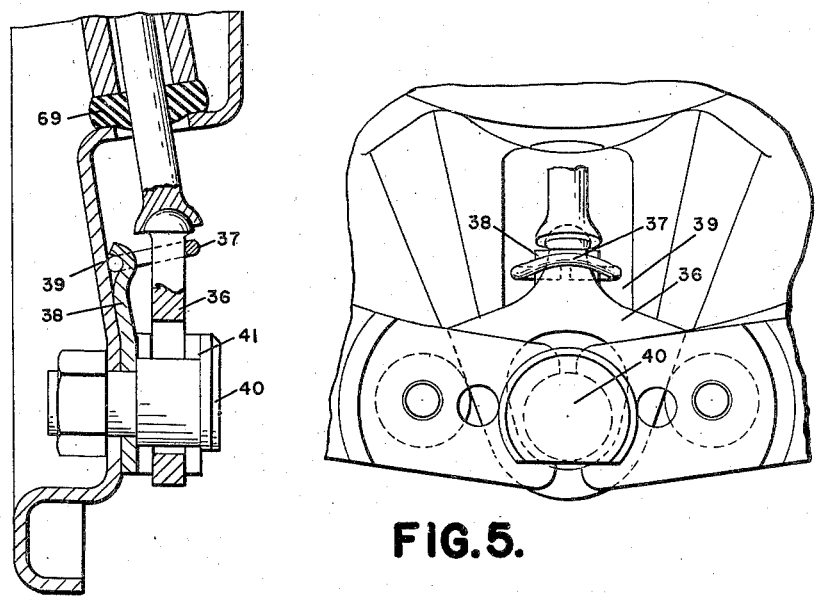
Figure 4 is a view similar to a portion of Figure 1 showing another embodiment of my invention.
Figure 5 is an elevation, partly in section, thereof.

In the modification shown in Figures 4 and 5 the upper and lower ends of the wedge and push rod are formed in the same manner as disclosed particularly in Figure 1, but they directly engage each other. The upper end of the wedge 36 is guided by the loop 37 which is preferably formed of wire and embraces the upper end below its head. This loop embraces and is pivoted upon the upper end of the plate 38 which is fixedly secured as by welding to the backing plate 39. The shouldered pin 40 extends through this plate 38 so that the latter serves to guide the adjacent extension plates at the lower ends of the brake shoes, the head 41 of the shouldered pin serving to guide the other extension plates.

Figures 6, 7:
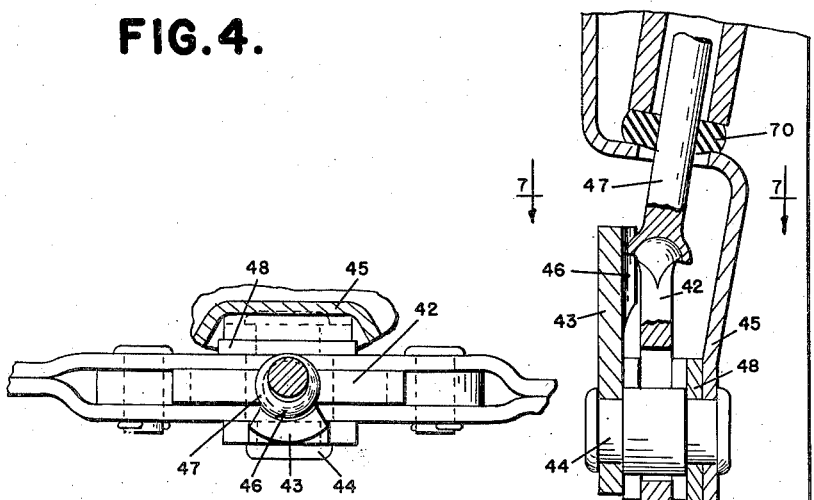
Figure 6 is a view similar to Figure 4 showing another embodiment of my invention.
Figure 7 is a cross section on the line 7—7 of Figure 6.

Figures 6 and 7 disclose another embodiment in which the upper end of the wedge 42 is guided by means of the plate 43 fixedly secured to the end of the shouldered pin 44 remote from the backing plate 45. The upper portion of the plate 43 is formed with the concave rounded bearing surface 46 for engaging the adjacent portion of the rounded head of the push rod 47. In this case it will be seen that the lower end of the push rod is directly guided to in effect guide the upper end of the wedge and that the guiding plate also serves to guide the adjacent extension plates at the lower ends of the brake shoes, the other extension plates being guided by the washer 48.

In the embodiment shown in Figures 8, 9 and 10, the guiding is accomplished by means of the plate 49 which is suitably welded to the backing plate 50 and which has at its lower end the oppositely extending wings 51 for guiding the adjacent extension plates at the lower ends of the brake shoes. The ends of these wings are formed with the open slots 52 which provide clearance for the adjacent ends of the pins 53 upon which the rollers 54 are journaled. The upper portion of the sheet metal plate 49 has the wings 55 and 56 which are bent away from the main portion of the plate to converge toward and meet each other, thereby forming a generally triangular box structure through which the push rod 57 and the wedge 58 pass. The ends of these wings are formed respectively with the tongues 59 and 60 which are clinched over to rigidly secure the wings in position. The sides of these wings are engageable with the rounded head at the lower end of the push rod and serve to guide the same during its movement, thereby serving to guide the upper end of the wedge.

In this modification the lower ends of the brake shoes are retracted by means of the coil springs 61 each having an end connected to the lower end of the brake shoe and another end connected to one of the wings 55 or 56.

Figures 11, 12 and 13 disclose another embodiment which is similar to that shown in Figures 8, 9 and 10, with the exception that the upper end portion of the sheet metal guiding plate 62 is provided with an opening 63 and is turned and twisted so that the portion of the metal 64 bordering the opening remote from the backing plate 65 forms an extended bearing for engaging the head at the lower end of the push rod 66. This push rod and the wedge 67 extend through the opening 63. It will be noted that the lower end portion of the plate 62 is formed with ears or wings similar to those shown in Figures 8, 9 and 10 to guide the actuated ends of the brake shoes.

For the purpose of preventing grease or other lubricant, dirt, water and the like, from entering the brake through the opening in the backing plate through which the push rod passes, I have provided the washers or grommets 68, 69, 70, 71 and 72 respectively in the brake mechanisms of Figures 1, 2 and 3, Figures 4 and 5, Figures 6 and 7, Figures 8, 9 and 10, and Figures 11, 12 and 13. Each washer or grommet fits tightly and is compressed to a predetermined extent between the lower end of the hollow pin or sleeve which forms the swivel for the steering knuckle and the upper face of the opposite portion of the backing plate. Each washer or screw also fits tightly upon its push rod so that there is no sliding motion between the washer or grommet and the push rod. Furthermore, each washer or grommet is formed of grease resisting rubber of suitable hardness, such as durometer 65 to 70, and of suitable thickness to provide a fluid motion in the rubber when its associated push rod is moved.

What I claim as my invention is:

1. In brake mechanism for a steering wheel of a motor vehicle, the combination of a brake drum, a backing plate, brake friction means within and engageable with said drum, a longitudinally movable member for actuating said brake friction means, a longitudinally movable rod for actuating said member and supported for limited lateral movement, and means upon said plate engageable with the rod at a point in the zone of engagement of the rod with said member for guiding said rod.

2. In brake mechanism for a steering wheel of a motor vehicle, the combination of a brake drum, a backing plate, brake friction means within and engageable with said drum, a longitudinally movable member for actuating said brake friction means, a second longitudinally movable member for actuating said first mentioned member and supported for limited lateral movement, said members extending at an angle to each other, and means upon said plate independent of said brake friction means and engageable with the end of the second member adjacent the first member for guiding said second member.

3. In brake mechanism, the combination of a brake drum, brake friction means within and engageable with said drum, said brake friction means having ends each of which is provided with a pair of laterally spaced end extensions and a roller located between said extensions, said extensions having the extremities thereof extending circumferentially beyond the rollers therebetween, and a longitudinally movable wedge having a flat sheet metal body extending between said extensions in sliding engagement with the inner surfaces of the extremities of the extensions and provided with diverging edges engaging said rollers.

4. In brake mechanism, the combination of a brake drum, a backing plate, brake shoes within and engageable with said drum, each of said shoes having a pair of laterally spaced end extensions and a roller located therebetween, a longitudinally movable wedge having a flat sheet metal body extending between said extensions and provided with diverging edges engageable with said rollers, said body having a central opening therethrough, and an abutment for said extensions extending through said opening and of a size providing clearance between said abutment and the edges of said opening whereby said wedge may adjust itself to said rollers.

5. In brake mechanism for a steering wheel of a motor vehicle, the combination of a brake drum, a backing plate, brake friction means within and engageable with said drum, a longitudinally movable member for actuating said brake friction means, a longitudinally movable rod for actuating said member and supported for limited lateral shifting movement, and a guide upon said backing plate for said member and having a portion engageable with said rod for guiding the latter.

6. In brake mechanism for a steering wheel of a motor vehicle, the combination of a brake drum, a backing plate, brake friction means within and engageable with said drum, a longitudinally movable member for actuating said brake friction means, a longitudinally movable rod for actuating said member, said member and rod extending at an angle to each other, and means upon said plate engageable with the brake friction means and member for guiding said member and brake friction means.

7. In brake mechanism for a steering wheel of a motor vehicle, the combination of a brake drum, a backing plate, brake friction means within and engageable with said drum, a longitudinally movable member for actuating said brake friction means, a second longitudinally movable member for actuating said first mentioned member, said members extending at an angle to each other, and means upon said plate engageable with both of the friction means and one of the members for guiding the latter member and said brake friction means.

8. In brake mechanism for a steering wheel of a motor vehicle, the combination of a brake drum, a backing plate, brake shoes within and engageable with said drum, a longitudinally movable wedge between said shoes for actuating the same, a longitudinally movable rod for actuating said wedge, and a lever pivotally mounted upon said backing plate and located between said wedge and rod and guiding the same.

9. In brake mechanism for a steering wheel of a motor vehicle, the combination of a brake drum, a backing plate, brake shoes within and engageable with said drum, a longitudinally movable wedge engageable with said shoes for actuating the same, a longitudinally movable rod for actuating said wedge, said wedge and rod extending at an angle to each other, and means upon said plate engageable with both the wedge and brake shoes for guiding said wedge and brake shoes.

10. In brake mechanism for a steering wheel of a motor vehicle, the combination of a brake drum, a backing plate, brake shoes within and engageable with said drum, a longitudinally movable wedge for actuating said shoes, a longitudinally movable rod for actuating said wedge, said wedge and rod extending at an angle to each other, means comprising a plate secured directly to said backing plate for guiding said wedge and shoes, and a member extending through said wedge and also guiding said shoes.

11. In brake mechanism for a steering wheel of a motor vehicle, the combination of a brake drum, a backing plate, brake shoes within and engageable with said drum, a longitudinally movable wedge for actuating said shoes, a longitudinally movable rod for actuating said wedge, said wedge and rod having cooperating interfitting rounded surfaces and extending at an angle to each other, and a plate secured to said backing plate having a portion for guiding said shoes and a second portion for guiding said rod.

12. In brake mechanism for a steering wheel of a motor vehicle, the combination of a brake drum, a backing plate, brake shoes within and engageable with said drum, a longitudinally movable wedge for actuating said shoes, a longitudinally movable rod for actuating said wedge, said wedge and rod having cooperating interfitting rounded surfaces and extending at an angle to each other, a plate secured to said backing plate having a portion for guiding said shoes and a second portion for guiding said rod, and shoe retractive means connected to said last mentioned plate.

13. In brake mechanism for a steering wheel of a motor vehicle, the combination with a brake drum, a backing plate, brake shoes within and engageable with said drum, a longitudinally movable wedge for actuating said shoes, a longitudinally movable rod for actuating said wedge, said wedge and rod having cooperating interfitting rounded surfaces, and a sheet metal plate secured to said backing plate and having an aperture therethrough for the passage of said wedge and rod, the portion of the metal bounding the edge of the opening remote from said backing plate being turned to provide an extended bearing surface.

14. In brake mechanism for a steering wheel of a motor vehicle, the combination of a brake drum, a backing plate, brake shoes within and engageable with said drum, a longitudinally movable wedge for actuating said shoes, a longitudinally movable rod for actuating said wedge, said wedge and rod extending at an angle to each other and both having heads at their adjacent ends, one of said heads being convexly rounded and the other being larger and correspondingly concavely rounded and fitting over the former, and a sheet metal plate secured to said backing plate and having an opening therethrough through which said wedge and rod may extend, the portion of the metal at the side of the opening remote from said backing plate being turned to provide an extended bearing surface engageable with said larger head to guide the same.

15. In brake mechanism for a steering wheel of a motor vehicle, the combination of a brake drum, a backing plate, brake friction means within and engageable with said drum, a longitudinally movable member for actuating said brake friction means, a second longitudinally movable member for actuating said first mentioned member, said members having cooperating interfitting rounded surfaces and extending at an angle to each other, and a plate secured to said backing plate having a main portion and wings extending therefrom, said wings providing surfaces for engaging and guiding one of said members.

16. In brake mechanism for a steering wheel of a motor vehicle, the combination of a brake drum, a backing plate, brake friction means within and engageable with said drum, a longitudinally movable member for actuating said brake friction means, a longitudinally movable rod engageable with said member for operating the latter, and means carried by the backing plate for guiding the member and brake friction means and having a portion engageable with the end of the rod in the zone of its connection with said member for also guiding said rod.

17. In brake mechanism for a steering wheel of a motor vehicle, the combination of a brake drum, a backing plate, brake friction means within and engageable with said drum, a longitudinally movable member for actuating said brake friction means, a longitudinally movable rod for operating said member, said member and rod extending at an angle to each other whereby movement of the rod produces a lateral force component which tends to displace the member laterally relative to the backing plate, and means upon said backing plate and engageable with the rod for guiding the latter in a path substantially parallel to the path of movement of said member.

FRANK L. MAIN.